United States Patent [19]

Luisi

[11] Patent Number: 4,778,183
[45] Date of Patent: Oct. 18, 1988

[54] BLACKJACK STRATEGY DEVICE

[75] Inventor: William P. Luisi, Wayne, N.J.

[73] Assignee: Greenjack Enterprises, Inc., Milltown, N.J.

[21] Appl. No.: 931,719

[22] Filed: Nov. 17, 1986

[51] Int. Cl.[4] ............................................. G09B 19/22
[52] U.S. Cl. .................................. 273/148 R; 434/129
[58] Field of Search .................... 434/129; 273/148 R; 364/412; 235/79.5, 87 R, 117 A; 116/223, 309

[56] References Cited

U.S. PATENT DOCUMENTS

| | | | |
|---|---|---|---|
| 2,417,719 | 3/1947 | Wahrt | 235/79.5 |
| 2,977,044 | 3/1961 | Reid | 235/79.5 |
| 3,526,357 | 9/1970 | Lefebvre | 235/79.5 |
| 3,556,398 | 1/1971 | Walsh | 235/117 A |
| 3,924,340 | 12/1975 | Tammone | 434/129 |
| 3,962,800 | 6/1976 | Feldheim | 434/129 |
| 4,052,073 | 10/1977 | Miller | 273/148 R |
| 4,217,696 | 8/1980 | Schindler | 235/79.5 |
| 4,266,770 | 5/1981 | Yeager | 273/148 R |

OTHER PUBLICATIONS

Scarne, *Scarne's Complete Guide to Gambling*, pp. 337–342, 1961, Simon & Schuster, "The Blackjack Disc", Crimar Games Inc.

*Primary Examiner*—Deborah L. Kyle
*Assistant Examiner*—Richard L. Klein
*Attorney, Agent, or Firm*—Richard C. Woodbridge

[57] ABSTRACT

A device for aiding a player playing the game of blackjack which includes an outer housing with a first and a second labelled window. The first window is labelled to indicate that a symbol for the dealer's up card value is displayed therein. The second window is labelled with a plurality of indicia signifying the possible values which are assigned to the player's card combinations. The device also has a carriage rotatably mounted inside the outer housing, and a chart is displayed on the surface of the carriage. A set of symbols which stand for the dealer's up card appear on the top of the chart, and a number of other symbols which indicate proper decisions by the player appear on the remainder of the chart. A knob at either end of the carriage retains the carriage in the outer housing and allows the player to hold the device and rotate the carriage by manipulating one of the knobs using only one hand. Manipulation of either one of the knobs causes the carriage and chart to rotate with respect to the outer housing and to display the dealer's up card value in the first window. At the same time the dealer's up card value is displayed in the first window, the symbol indicating the proper decision by the player is displayed in the second window alongside the symbol which corresponds to the player's particular card combination.

To use the device, the player uses his thumb and forefinger to turn one of the knobs, causing the symbol for the dealer's up card to appear in the first window. The player then glances at the second window, next to the indicia signifying the particular value assigned to the card combination in the player's hand, and reads the proper decision whether to hit, stand, double or split according to precalculated probabilities of the player winning that blackjack hand against the dealer.

10 Claims, 5 Drawing Sheets

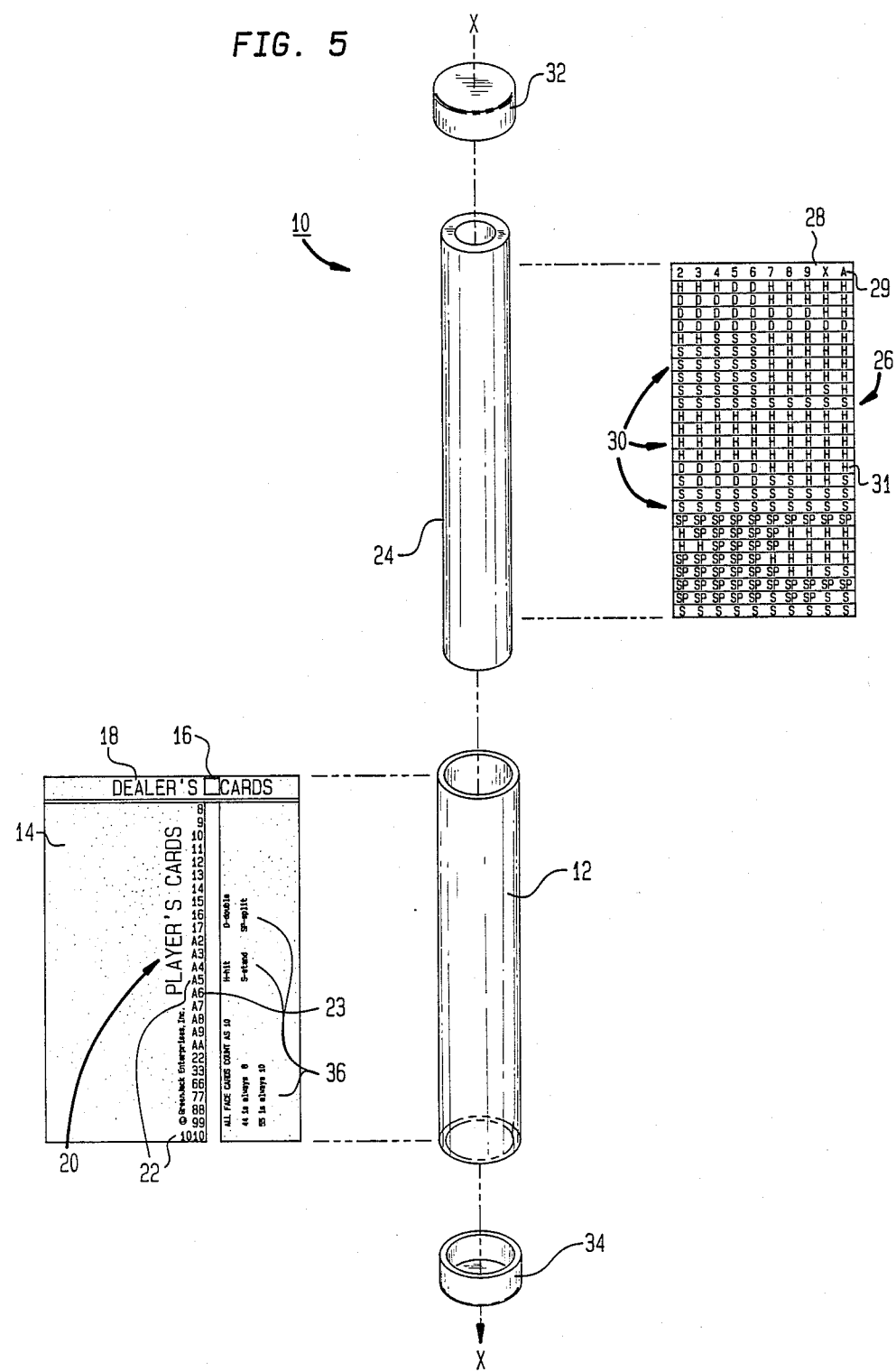

BLACKJACK STRATEGY DEVICE

BACKGROUND OF THE INVENTION

1. Field of the Invention

The present invention pertains to a device for aiding a player playing the card game of blackjack.

2. Background of the Related Art

In the game of blackjack (or 21) a player receives two cards and is required to decide almost instantly whether to:

HIT and receive an addition card;

STAND and rely on the cards that he was dealt;

SPLIT the pair and play each card as a separate hand (if the player was dealt a pair); or, DOUBLE his bet before receiving an additional card (also known as Doubling Down).

To decide whether to HIT, STAND, SPLIT or DOUBLE, many players rely on luck or intuition, others, including the more sophisticated players, learn a complex strategy for playing blackjack which they memorize. Blackjack strategy is readily available in many publications, for example *Scarne's Complete Guide to Gambling* by John Scarne, Simon & Schuster (1961). This strategy, however, is difficult for the occasional blackjack player to remember and use against a professional blackjack dealer in an actual casino game situation.

In many casinos, including those in Atlantic City, N.J., players are permitted to use a chart which summarizes the blackjack strategy. However, the time it takes most players to look up the proper decision on the chart is usually long enough to bring the game to a standstill. Accordingly, the state agencies regulating the rules of casino gambling, including the New Jersey Casino Control Commission, permit the dealer to eject a player for unduly delaying the game.

Crimar Games, Inc. has marketed a device (hereinafter "the Crimar device") made from two concentric circular disks joined at their centers. The Crimar device serves the same purpose as a chart, but the manufacturer claims it is easier to use. The device can be used with one hand, however, there are over 40 possible positions to which the disks of the Crimar device may be rotated and the position of the disk must be changed each time the player is dealt an additional card. These manipulations are difficult in actual game situations, for example, a player may have to rotate the disk several times during one blackjack hand and in one manipulation the player may have to move the disk 180 degrees using only one hand. Therefore, use of the Crimar device may unduly delay the game, and might not permit the player to enjoy the game by constantly requiring the player to manipulate the disk each time the player is dealt an additional card.

Another device disclosed in U.S. Pat. No. 3,924,340 entitled BLACKJACK TEACHING DEVICE issued to Tammone on Dec. 9, 1975 (hereinafter "the Tammone device") is easier to manipulate. However, the device is primarily directed towards teaching strategy to a blackjack player and is not practical for use during an actual game of blackjack. The Tammone device requires the user to make several mental calculations and decisions after reading the displayed data. The calculations and decisions are not difficult to make if a player is learning the game at home. However, decisions, such as whether the player has a "regular" or "soft" hand, whether the hand falls into one of two categories for which the player should STAND or DOUBLE DOWN and whether the player's hand falls within the category of pairs which should be SPLIT, are next to impossible to make in a pressure packed casino gambling situation. The pause required to make these decisions would unduly delay the game and the dealer would be justified in ejecting the player from the table.

Another type of device is disclosed in U.S. Pat. No. 4,052,073 entitled BLACKJACK PLAY DIRECTOR issued to Miller on Oct. 4, 1977 (hereinafter "the Miller device"). The Miller device does not require a player to make mental manipulations or decisions and provides an easy to read display. However, the Miller device is an electronic calculator-like mechanism which would probably not be allowed at the blackjack tables of most casinos.

The related art also includes several patents for devices which electronically or electro-mechanically simulate the game of blackjack. These include U.S. Pat. Nos. 3,962,800, 3,689,071 and 3,796,433, however, these devices are not intended nor can they be used during an actual game of blackjack. Also of interest is U.S. Pat. No. 4,266,770 issued to Yeager for a BLACKJACK 21 COMPUTER ("the Yeager device ∞"). This device allows the player to keep track of a running count of cards which were dealt, rather than providing the player with the correct decision during a particular blackjack hand.

Accordingly, none of the related art discloses a device which can be held in one of the player's hands and easily manipulated to provide the player with the proper decision quickly enough to be practical for use in the fast paced blackjack games which are played in gambling casinos. Also, none of the related art discloses a device which would quickly and easily perform these functions and still be allowed by the casinos, and their respective state gaming control commissions, to be used at their blackjack tables.

SUMMARY OF THE INVENTION

Briefly, the present invention is a device for aiding a player playing the game of blackjack to decide whether to HIT, STAND, DOUBLE or SPLIT his hand according to the probabilities of the player, having a particular card combination, winning the blackjack hand against the dealer's up card value. The device has an outer housing with two labelled windows. The first window is marked to indicate that it displays the dealer's up card value, and the second window is marked with a plurality of indicia signifying the possible values of the player's card combinations.

A carriage with a chart on its surface is housed inside the outer housing. The chart includes a first set of symbols standing for the dealer's up card value which are displayed in the first window. Additional sets of symbols are included below the first set of symbols, these indicate the proper decisions by the player, depending on the combination of the particular dealer's face card value and the player's card combination, the value of which is labelled alongside the second window. The carriage and chart are mounted inside the outer housing and all have a common longitudinal axis.

Carriage manipulation knobs are attached to either end of the carriage. The knobs retain and align the carriage inside the outer housing, and allow the player to hold the device and rotate the carriage with respect to the outer housing using only one hand. Rotation of the carriage with respect to the outer housing displays the dealer's up card value in the first window and simultaneously displays the possible decisions for each of the possible player's card combinations in the second window. Once the player causes the dealer's up card to be displayed in the first window the player need only glance at the second window to read the symbol indicating the proper decision whether to HIT, STAND, DOUBLE or SPLIT, which is positioned next to the indicia standing for the player's particular card combination.

BRIEF DESCRIPTION OF THE DRAWINGS

FIG. 5 is an exploded view of device illustrated in FIG. 2.

DETAILED DESCRIPTION OF THE PREFERRED EMBODIMENT

Figure 1:
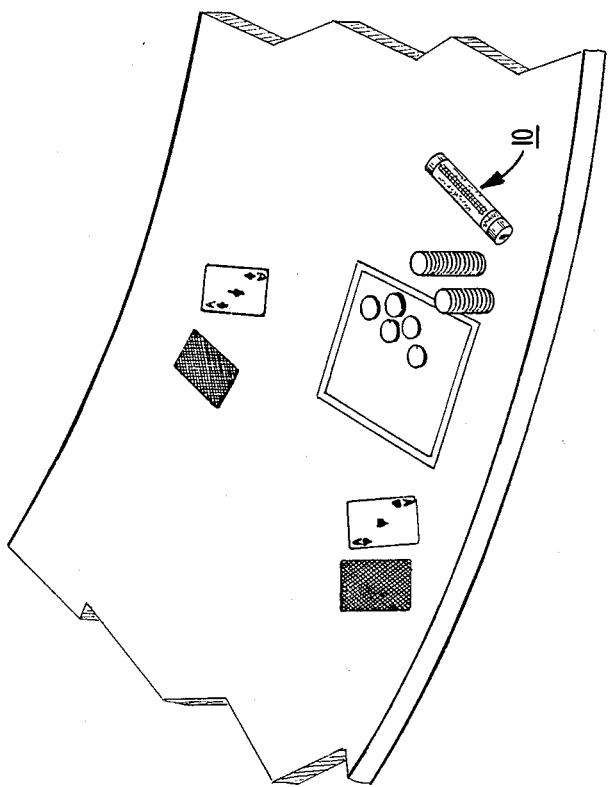
FIG. 1 is a perspective view illustrating a player using the preferred device of the present invention while playing the game of blackjack (the dealer is not shown).

The rules of blackjack vary in minor detail from one locale to another, however, in casino gambling in Atlantic City, N.J. the rules as governed by the New Jersey Casino Control Commission are as folows: All players are dealt two cards facing upwards, the dealer is dealt one card facing down and one up card. If a player receives a pair of numerically identical cards, the player may elect to either play the two cards as one hand or SPLIT the pair and receive an additional card for each of the split cards. The player would then bet independently on each hand and play each as an independent hand. In addition to splitting pairs, the player may STAND and not receive any more cards, or ask to be HIT and receive an additional card and continue to receive additional cards until the player decides to either STAND or the total numerical value of the cards exceeds 21 and the player "busts." The last option for the player is to DOUBLE his bet and receive one additional card. This is referred to as DOUBLING down since in Las Vegas the additional card is dealt face down. After all players have either decided to STAND, DOUBLE or have "busted", the dealer turns over his down card and continues to HIT until the total numerical value of the dealer's hand equals or exceeds 17. If the dealer's total exceeds 21 the dealer "busts" and all players who did not "bust" are declared winners. If the dealer does not "bust" all players having hands with a numerical total below that of the dealer lose, all players having hands with a numerical total equal to the dealer tie, and all players having hands with a numerical total that is higher than the dealer win. When a player receives a face card and an Ace, his hand is known as "BLACKJACK".

In blackjack the numbered cards count for their face value while a 10, Jack, Queen and King count 10 points each. An Ace will count for either 1 or 11 points depending on the intention of the player. However, with one exception, the dealer's Ace always counts 11 points and the dealer must hit until the point total of his hand is 17 or greater. The one exception is when the dealer's point total is less than 17 and the dealer hits, if having the Ace count as 11 causes the dealer to "bust", i.e., his point total exceeds 21, then the Ace will only count as 1 point. Accordingly, the dealer has no discretion in deciding whether the Ace counts as a 1 or an 11.

Under the Rules governing most state licensed casinos, including those in Atlantic City, N.J. which are regulated by the New Jersey Casino Control Commission, charts which exhibit the basic blackjack strategy are permitted to be used by players at casino blackjack tables. However, if use of the chart unduly delays the game, then the dealer is permitted to eject the player using the chart from the table. In addition to the charts, to date, the present invention is the only strategy device which the New Jersey Casino Control Commission has specifically ruled does not violate the existing rules and regulations of casino gambling and must be permitted by the casinos at their blackjack tables.

Referring now to the drawings, as shown in FIG. 1 the dealer's up card is an Ace and the player has been dealt an Ace and a Six. Therefore, the player's card combination is designated A6 and his point value is either 7 or 17. The player must instantaneously decide whether to HIT, STAND, DOUBLE or SPLIT (if the player had a pair).

The player having manipulated the preferred device 10 so that the symbol for an Ace 29 "A" appears in the first window 16, which is labelled "DEALER'S CARDS" 18, only needs to quickly glance at the set of symbols 31 displayed in the second window 20 and focus on the portion labelled "A6" 23 to see that the proper decision "H" meaning HIT and then gesters the dealer to HIT. See, the more detailed view of the preferred device 10 illustrated in FIG. 2.

Figure 2:
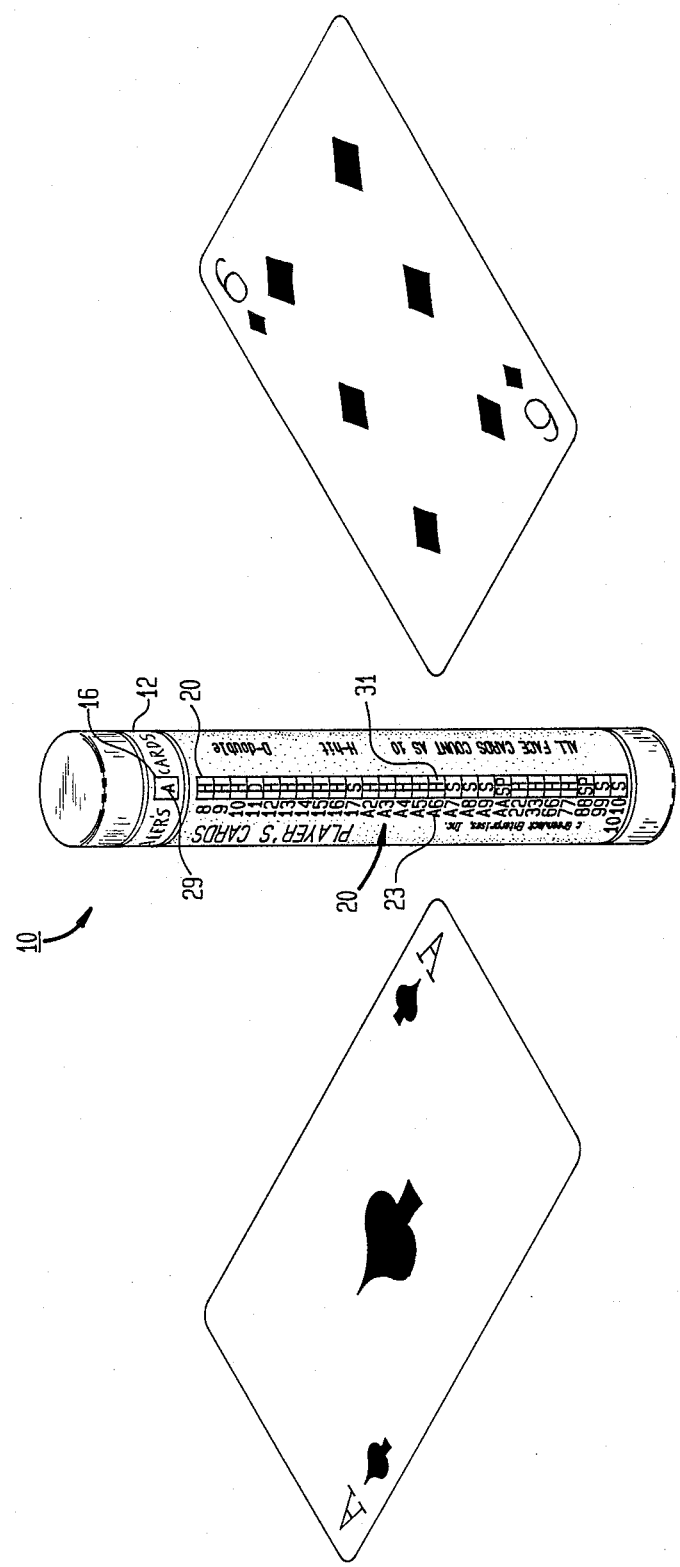
FIG. 2 is a perspective view of the preferred embodiment of the present invention with the carriage rotated to the proper position when the dealer's up card is an Ace.
Figure 3B:
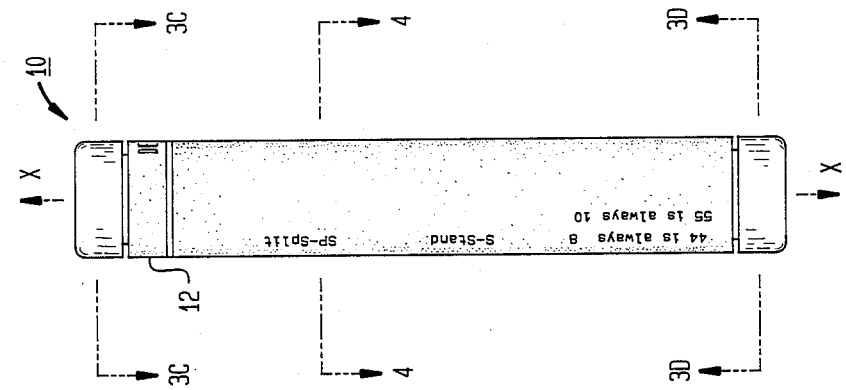
FIG. 3B is a rear elevational view with the device illustrated in FIG. 2.
Figure 3A:
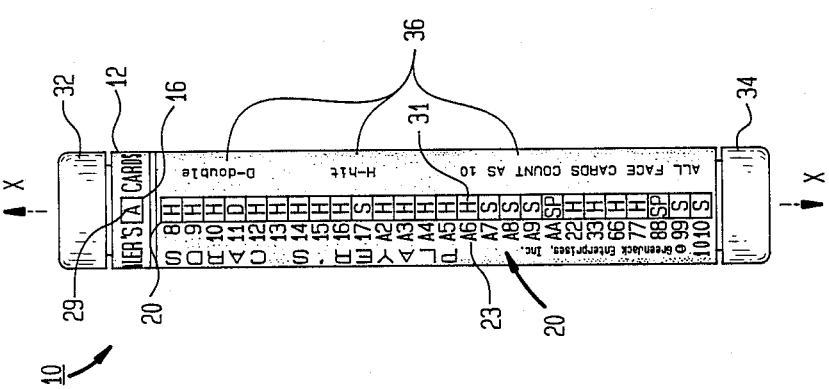
FIG. 3A is a front elevational of the device illustrated in FIG. 2.
Figure 3C:
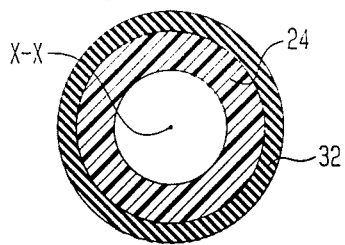
FIG. 3C is a cross-sectional view of the device illustrated in FIG. 3B along the line 3C—3C taken in the direction of the arrows.
Figure 3D:
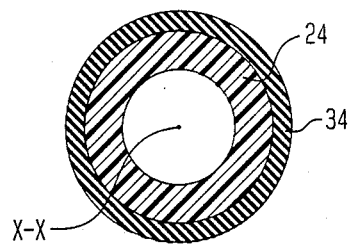
FIG. 3D is a cross-sectional view of the device illustrated in FIG. 3B along the line 3D—3D taken in the direction of the arrows.
Figure 4:
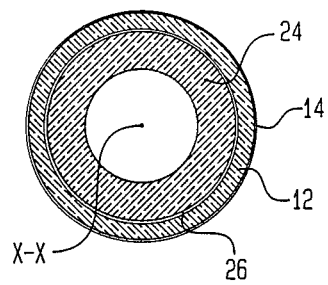
FIG. 4 is a cross-sectional view of the device illustrated in FIG. 3B through line 4—4, taken in the direction of the arrows.

As illustrated in FIGS. 2-5, the preferred device 10 for aiding a player to play the game of blackjack includes an outer housing 12 which has a first window 16 labelled with an indicia 18 indicating that one particular symbol 29 from the set of symbols 28 which stands for the dealer's up card value is displayed in window 16. As illustrated in FIGS. 2 and 5, window 16 is labelled with the indicia 18 "DEALER'S CARDS". The outer housing 12 also includes a second window 20 which is labelled with indicia 22 which indicate each of the possible values which are assigned to the player's card combinations. As shown in FIG. 5, the second window 20 is labelled "PLAYER'S CARDS" and the following indicia 22 appear alongside the second window 20 parallel to the rotational axis X—X of the outer housing 12:

"8, 9, 10, 11, 12, 13, 14, 15, 16, 17, A2, A3, A4, A5, A6, A7, A8, A9, AA, 22, 33, 66, 77, 88, 99, 1010."

In addition, the outer housing 12 is labelled with a glossary of terms 36 explaining the symbols 30 appearing in the second window 20:

"H-hit, S-stand, D-double and SP-split."

and

"All face cards count as 10, 44 is always 8, 55 is always 10."

A carriage 24 is mounted rotatably inside the outer housing 12. Carriage 24 has chart 26 mounted, printed, painted or otherwise affixed on its outer surface. Chart 26 includes a first set of symbols 28 which stand for the dealer's up card value. In the preferred embodiment of the device 10 these symbols 28 comprise the top horizontal row of symbols on the chart 26 and include the following symbols: "2, 3, 4, 5, 6, 7, 8, 9, X, A". This first set of symbols 28 is aligned so that each particular symbol 29 may be displayed in the first window 16 of the outer housing 12.

Chart 26 also includes a number of additional sets of symbols 30. In the preferred embodiment of the device 10 there are ten sets of additional symbols 30, each set 31 of additional symbols corresponds to and is aligned in a vertical column below each particular symbol 29 from the first set of symbols 28 for the dealer's face card value. Each additional set of symbols 31 includes the proper decisions for the player to HIT, STAND, SPLIT a pair of DOUBLE calculated according to the probabilities of the player winning a blackjack hand against the dealer having the particular up card value 29, when the player has the particular card combinations labelled by the indicia 22 at the second window 20 which line up with each symbol in the set 31 of symbols.

As shown in FIG. 5, in the preferred device 10 the carriage 24 and the other housing 12 are made up of two transparent elongated cylinders, and the carriage 24 with the chart 26 on its outer surface, is rotatably mounted inside the outer housing 12 so that all three components have a common longitudinal and rotational axis X—X.

Two knobs 32 and 34, respectively, are mounted on the upper and lower portions of the carriage 24. The knobs 32, 34 keep carriage 24 and chart 26 properly aligned with the first 16 and the second 20 windows inside outer housing 12. The knobs 32, 34 are fixed to the top and bottom ends of carriage 24 and are used by the player to rotate carriage 24 along with chart 26 relative to the outer housing 12. The player can easily hold device 10 with one hand and manipulate either the first 32 or second 34 knob with his thumb and forefinger to rotate the carriage 24 and chart 26 relative to the outer housing 12 to display the particular symbol 29 for dealer's up card value in the first window 16.

Then, when a particular symbol 29 for a dealer's up card value is displayed in the first window 16, the particular set 31 of symbols which corresponds to the particular symbol 29 for a dealer's up card value is displayed in the second window 20. Each of the symbols in that particular set 31 of symbols is aligned next to a particular indicia 23 which stands for the numerical value of the player's card combination. As shown in FIGS. 1-5, in the preferred device 10 the first window 16 and the second window 20 are aligned vertically in a straight column on the surface of the outer housing 12 parallel to the common central rotational axis X—X of the outer housing 12 and carriage 24.

Once the particular symbol 29 for the dealer's up card value is rotated by the player into the first window 16, then the player only needs to quickly glance at the second window 20 and focus on the particular indicia 23 which stands for the value of his hand and read the symbol in the second window 20 next to particular indicia 23 in order to know the proper decision for his particular blackjack hand.

While the invention has been described with reference to a preferred embodiment thereof, it will be appreciated by those of ordinary skill in the art that various modifications can be made to the structure and steps of the invention without departing from the spirit and scope thereof.

I claim:

1. A device for aiding a player playing the game of Blackjack according to precalculated probabilities of the winner winning a Blackjack hand against each particular combination of a dealer's up card value and the player's card combination, comprising:
    (a) an outer housing which includes a first and a second labeled window means,
        (i) said first labeled window means is labeled with an indicia indicating that a symbol for the dealer's up card value is displayed therein,
        (ii) said second labeled window means is labeled with a plurality of indicia standing for values assigned to the possible player's card combinations, and wherein said second labeled window means is linearly transposed from said first labeled window means, both being parallel to a vertical long axis of said outer housing,
    (b) carriage means having chart means thereon, said chart means including,
        (i) a first set of symbols standing for the dealer's up card value, said first set of symbols displayed in said first labeled window means,
        (ii) a plurality of additional sets of symbols, each symbol instructing the player whether to hit, stand, double or split, depending upon the combination of the particular dealer's up card value and the player's card combination, said additional sets are displayed in said second labeled window means, and wherein said first set of symbols are transposed on said chart means horizontally, perpendicular to said horizontal long axis of said outer housing and each set of symbols from said plurality of additional sets of symbols corresponds to and is linearly transposed from each symbol from said first set of symbols and parallel to said long axis of said outer housing, each of said additional sets of symbols including a plurality of symbols transposed linearly and parallel to said long axis of said outer housing, each of said additional symbols instructing the player whether to hit, stand, double or split depending upon the player's card combination and on the dealer's up card value; and,
    (c) carriage manipulation means coupled to said carriage means for rotating said carriage means within said outer housing.

2. The device recited in claim 1, wherein said carraige means and said chart means are mounted movably along said longitudinal axis within said outer housing, whereby manipulation by the player of said carriage manipulation means causes said carriage means and said chart means to move about said longitudinal axis with respect to said outer housing to display the symbol for the dealer's up card value from said first set of symbols in said first window means, and display in said second labelled window means the set of symbols instructing the player to hit, stand, double or split, from said plurality of additional sets of symbols which corresponds to the symbol displayed in said first labelled window means.

3. The device recited in claim 2, wherein, (a) said first set of symbols includes ten symbols standing for the ten possible dealer's up card values; and, (b) said plurality of additional sets of symbols includes ten sets of symbols each set corresponding to each of said symbols from said first set of symbols standing for the dealer's up card value.

4. The device recited in claim 3, wherein said first set of symbols are transposed horizontally, perpendicular to said long axis of said outer housing, along said chart means; and each of said ten additional set of symbols is transposed linearly and parallel to said long axis of said outer housing in a direction away from each of said symbols from said first set of symbols to which that set corresponds.

5. The device recited in claim 4, wherein said carriage means is cylindrical.

6. The device recited in claim 5, wherein said outer housing is made from a transparent material.

7. A device for aiding a player for playing the game of Blackjack according to precalculated probabilities of the player winning a Blackjack hand against each particular combination of a dealer's up card value and the player's card combination comprising:

(a) an outer housing which includes a first and a second labeled window means, said second labeled window means is transposed linearly from said first labeled window means both being parallel to a long axis of said outer housing, (i) said first labeled widow means is labeled with an indicia indicating that a symbol for the dealer's up card value is displayed therein, (ii) said second labeled window means is labeled with a plurality of indicia standing for values assigned to the player's card combinations;

(b) carriage means having chart means thereon, said chart means including:

(i) a first set of symbols standing for the dealer's up card value, said first set of symbols displayed in said first labeled window means, (ii) a plurality of additional sets of symbols, each symbol instructing the player whether to hit, stand, double, or split, depending upon the combination of the particular dealer's up card value and the player's card combination, said additional sets are displayed in said second labeled window means, and wherein said first set of symbols are transposed on said chart means horizontally, perpendicular to said vertical long axis of said outer housing and each set of symbols from said plurality of additional sets of symbols corresponds to and is linearly transposed from each symbol from said first set of symbols and parallel to said long axis of said outer housing, each of said additional sets of symbols including a plurality of symbols transposed linearly and parallel to said long axis of said outer housing, said additional symbols instructing the player whether to hit, stand, double or split depending upon the player's card combination and on the dealer's up card value, (c) carriage manipulation means coupled to said carriage means for rotating said carriage within said outer housing, wherein said carriage means and said chart means are mounted movably along said longitudinal axis within said outer housing, whereby manipulation by the player of said carriage manipulation means causes said carriage means and said chart means to move about said longitudinal axis with respect to said outer housing to display the symbol for the dealer's up card value from said first set of symbols in said first labeled window means, and display in said second labeled window means the set of symbols instructing the player whether to hit, stand, double or split, from said plurality of additional sets of symbols which correspond to the symbol displayed in said first labeled window means.

8. The device recited in claim 7, wherein, (a) said first set of symbols includes ten symbols standing for the ten possible dealer's up card values; and, (b) said plurality of additional sets of symbols includes ten sets of symbols each set corresponding to each of said symbols from said first set of symbols standing for the dealer's up card value.

9. The device recited in claim 8, wherein said first set of symbols are transposed horizontally, perpendicular to said long axis of said outer housing, along said chart means; and each of said ten additional sets of symbols is transposed linearly and parallel to said long axis of said outer housing in a direction away from each of said symbols from said first set of symbols to which that set corresponds.

10. The device recited in claim 9, wherein said outer housing means is transparent.

* * * * *